Oct. 27, 1936.  G. ARRAS  2,058,548
FLOODLIGHT REFLECTOR
Filed March 30, 1934
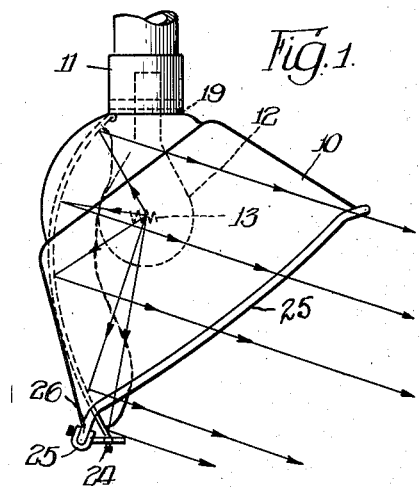
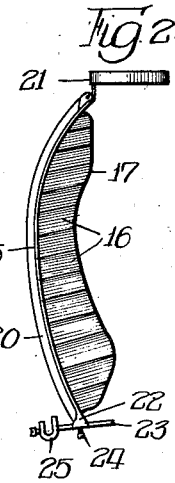
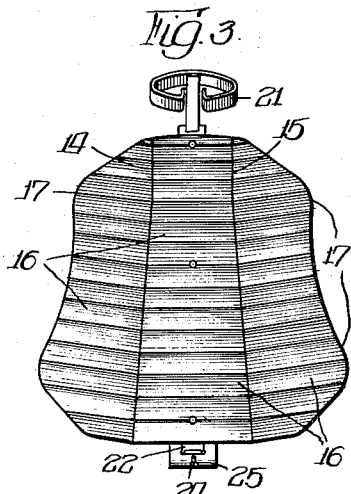
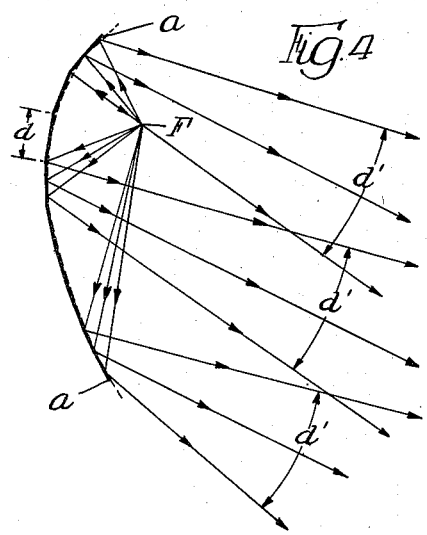
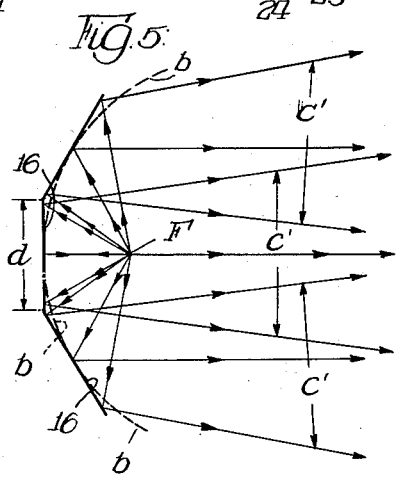
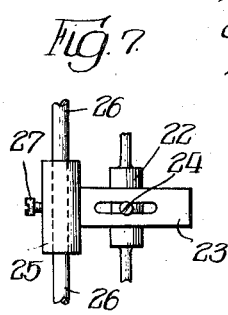
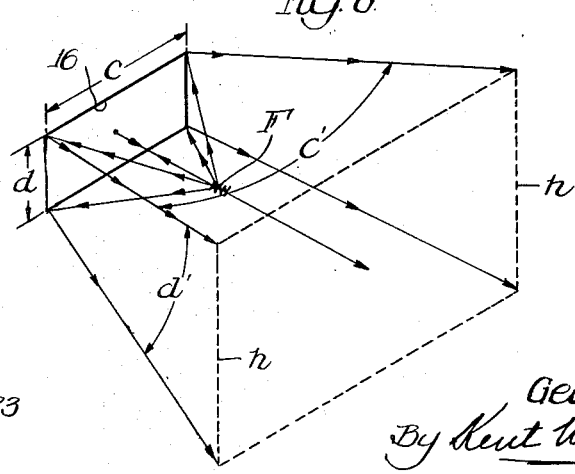
Inventor
George Arras.
By Kent W. Wonnell
att'y.

Patented Oct. 27, 1936

2,058,548

UNITED STATES PATENT OFFICE 2,058,548

FLOODLIGHT REFLECTOR

George Arras, Chicago, Ill.

Application March 30, 1934, Serial No. 718,227

5 Claims. (Cl. 240—103)

This invention relates in general to a lighting fixture and has more particular reference to a flood lighting unit in which a reflector is included for directing the light from a single source to a specific area, preferably of a substantially rectangular shape so that a number of such units can be positioned for illuminating a larger area and providing a definite illumination therefor.

An important object of the invention is in the provision of a projector included in a reflector, the projector comprising a number of substantially rectangular surfaces which together form a parabolic reflector curved transversely and rectangularly or spherically so that all the reflecting surfaces which make up the projector will concentrate the reflected light upon substantially the same rectangular area.

A further object of the invention is in the provision of a separate and adjustable projector unit which may be releasably connected in existing types of reflectors or may be seated in a reflector particularly designed for the projector unit.

Other objects of the invention will appear hereinafter, the accompanying drawing illustrating a preferred embodiment of the invention and the method of operation of the structure.

In the drawing, Fig. 1 is a side elevation of a flood-lighting unit in accordance with the invention;

Fig. 2 is a section; and

Fig. 3 is an elevation of a projector unit in accordance with the principles of this invention;

Fig. 4 is a diagrammatic representation of the vertical distribution of light from one of the projector sections;

Fig. 5 is a diagrammatic representation of a transverse distribution of light from the projector sections;

Fig. 6 is a diagrammatic representation of the projection of light from only one of the reflector surfaces of the projector; and Fig. 7 is a detail of the projector adjustment.

In flood-lighting large areas such as signboards, playing grounds, oil station properties, and wherever flood-lighting is required, it is desirable to have each flood-light unit directed to a certain specific area so that it can be determined how many flood-lights are necessary and so that the illumination from one lamp will not overlap that of the adjacent ones. In the old type of round reflectors it is necessary to provide a large number of units and to overlap the projected beams in order to present an illuminated area which has no bright spots or no dark spots. The present invention is intended to provide a flood-lighting unit in which the projected beams are so definitely controlled that the illumination can be accurately figured and located, thereby requiring less lighting units to properly illuminate a given area which requires more than one lighting unit, and also to definitely illuminate a given rectangular space with but one unit.

In carrying out this invention, a metal reflector 10 preferably having a somewhat rectangular opening is supported eccentrically by a shell 11 in which a lamp 12 is also carried, having a concentrated lighting element 13 located at the focus of the reflector and of the projector unit which is mounted therein.

This projector unit as shown more clearly in Figs. 2 and 3, comprises a metal or other highly reflecting surface divided by lines 14 and 15 into three sections, each of which is composed of separate flat reflecting surfaces 16 substantially rectangular in the case of the central section of the projector, and more or less rectangular in the other sections of the projector, depending upon the contour of the outer edges 17.

The reflecting surfaces 16 of the middle or either of the side sections together define a parabolic contour as shown in Fig. 2 and as represented by the line $a$ in Fig. 4. The reflecting surfaces of the projector sections also define a parabolic reflector transversely thereof as represented by the line $b$ in Fig. 5, so that the projector is of parabolic outline both vertically and transversely of an inner focal point F as designated in Figs. 4 and 5, corresponding to the position of the lighting element 13 of the lamp 12 in the reflector.

The rectangular plane surfaces will have portions at the corners thereof which are not in the parabola as the center of that plate, or in other words, if the planes are tangent to the parabola $a$ and $b$ at the centers, the corners of the plane surfaces 16 will not be in the same parabola. This produces a divergence of the rays from each surface, as clearly shown in Figs. 4 and 5, but the composite result of the entire plate is to produce a broad triple beam of light focused on the same space which is highly and brightly illuminated.

These separate plane surfaces 16 being located both vertically and transversely in the same parabolic surfaces will cause a reflection of all of the planes substantially in the same direction, thereby accumulatively lighting the same rectangular area depending upon the focal length and the size of the parabolas.

A single reflecting surface having dimensions C and D as represented in Fig. 6, and a lighting unit at the focus F will cause an angular dispersion of light about the angles c' and d' conforming thereto and illuminating a larger rectangular area as represented by the outline h—h. Combining the several reflecting surfaces 16 of a single section of the projector as represented in Fig. 4, the different upper, lower and intermediate planes 16 will cause a divergence from each plane 16 of substantially the same angle d' and all of the surfaces together will cause a wider divergence of the projected light but the reflected light therefrom accumulated at some distant point, depending upon the focal length and the parabola will effectively illuminate substantially the same space. Similarly the reflecting surfaces 16 of adjacent sections of the projector as represented in Fig. 5, will similarly illuminate the same space transversely because of the divergence c' of the angular rays from any reflecting surface 16 thereby causing in effect each separate plane 16 to be directed to the illumination of the same surface at a distance from the source of light.

With this construction it is apparent that the maximum illumination of a rectangular area will be afforded, the separate planes all directing the light from the focal point to the illumination of the same rectangular area.

The projector is preferably formed of a single sheet of metal and the plane surfaces 16 are pressed or formed therein in the double parabolic form, the reflecting surface of the projector is polished or coated to make it highly reflective and the projector plate is mounted or secured to a rib 20 at the rear thereof which is pivotally connected to a spring ring 21 at the top by means of which the projector is inserted within and yieldingly secured within the neck of a supporting shell 11, the lower edge of which is commonly provided with a supporting rib or bead 19 within which the spring ring 21 may be inserted. At the lower end of the supporting rib 20 is a shoe 22 for receiving a slotted strip 23 with an adjusting screw 24 extending through the slot thereof and into the shoe 22. One end of the strip 23 is attached to a bracket 25 adapted to embrace the edge 26 of the reflector 10 to which it is adjustably clamped by a screw 27. With this construction the projector is first attached at the top by inserting the spring ring 21 within the shell 11, then attaching the bracket 25 to the lower edge of the reflector 10, and then adjusting the set screw 24 so that the reflecting surface of the projector will be properly focused with respect to the lamp and its source of light.

It will be observed that the planes of the reflecting surfaces 16 are substantially tangent at their centers to a line forming a parabola or the lines connecting the centers of the surfaces may be said to form the chords of a parabola either transversely or vertically with respect to the projector plate. This construction intercepts a large portion of the light and projects it in an extremely long and broad beam. It is in effect a triple beam projector for delivering a longer and broader beam and puts the illumination where it is wanted.

I claim:

1. A projector comprising a plate having connected plane surfaces arranged within the outline of parabolas extending vertically and transversely and having a common focus, and a support for the top of the plate comprising a hinging ring for mounting it within the supporting shell of a reflector.

2. A projector comprising a plate having a plurality of connected plane surfaces extending at angles to each other and together defining parabolic surfaces extending at right angles to each other and having a common focus, means for supporting the plate to swing from the top thereof, and adjusting means at the bottom of the plate for securing it to the edge of a reflector and varying its angular position about the top support.

3. The combination with a reflector and a lamp therein, of a projector comprising a plate with a plurality of connected surfaces disposed at angles to each other and together defining parabolic curves at right angles to each other and having a common focus, means for supporting the projector at the top of the reflector with the lamp at the common focus, and means for adjustably securing the projector to the outer edge of the reflector.

4. A lighting fixture comprising a reflector having an outer rim, an inner supporting shell, and a lamp supported from the shell in the reflector, a projector having a supporting ring adapted to engage within the shell of the reflector, a clamp secured to the outer rim of the reflector and an adjusting means between the clamp and the lower edge of the projector for varying the position of the projector about the upper support with respect to the lamp within the reflector.

5. In a lighting fixture, the combination with a reflector having a supporting shell and an outer marginal rim, a lamp supported from the shell within the reflector, a parabolic beam projector comprising a plate having a plurality of connected rectangular surfaces extending transversely with respect to a common focus, means for supporting the plate for pivotal movement from within the shell of the reflector, and an adjusting clamp for engaging the rim of the reflector and movable toward and from the reflector with respect to the lamp therein, and about the upper support as an axis.

GEORGE ARRAS.